Sept. 10, 1963 N. J. WOODLAND 3,103,593

PULSE GENERATOR

Filed Dec. 30, 1958

INVENTOR
NORMAN J. WOODLAND

BY John P. Dority
ATTORNEY

United States Patent Office 3,103,593
Patented Sept. 10, 1963

3,103,593
PULSE GENERATOR
Norman J. Woodland, Binghamton, N.Y., assignor to International Business Machines Corporation, New York, N.Y., a corporation of New York
Filed Dec. 30, 1958, Ser. No. 783,989
2 Claims. (Cl. 307—88)

This invention relates to pulse generators and particularly to emitter type pulse generators wherein pulses are supplied in a timed sequence at an output circuit.

Emitters are well known where a brush or the like having a potential applied thereto is swept over a plurality of contact points. Each contact point supplies an output and, thus, pulses or signals are supplied in a timed sequence. Also, electronic ring circuits are well known where the several stages of the ring are sequentially turned on to supply pulses in a timed sequence from the various stages.

According to a preferred embodiment of the present invention, a plurality of magnetic cores are arranged to sequentially change their state of remanent magnetization and as a consequence supply a timed sequence of output pulses. Such a solid state pulse generator has a number of distinct advantages among which is the advantage that a magnetic core does not wear out. In contrast to this, a vacuum tube eventually fails because of the deterioration of the electrodes or for other reasons. The mechanical emitter is susceptible to wear and thus eventually deteriorates.

An object of the present invention is to provide an improved pulse generator.

Another object is to provide a simplified pulse generator.

Another object is to provide an economical solid state pulse generator.

Still another object of the present invention is to provide an improved pulse generator wherein the number of input driving pulses may exceed in any predetermined manner the number of output pulses provided.

According to the preferred embodiment of the present invention, a plurality of magnetic cores each having substantial retentivity are arranged to sequentially change their state of remanent magnetic flux in response to input signals supplied thereto. The several cores are linked by a single conductor such that the first core to have its state changed has a greater number of turns thereon than the next core of the sequence. The second core has a larger number of turns than does the third core of the sequence, etc. The single conductor threading these plurality of magnetic cores may be driven by the output of a saturable reactor or magnetic amplifier. The magnetic amplifier has a sawtooth waveform supplied to it on one winding and an alternating current on another winding. The alternating current winding is in series with the primary of a trasformer such that the secondary of the transformer receives a signal in response to the alternating current in proportion to the current supplied through the sawtooth winding. As the saturable reactor goes toward saturation, the alternating current supplied to the secondary of the transformer increases. The secondary of the transformer is in series with a recitifier so that the output from the secondary of the transformer is a series of current pulses increasing in amplitude as the sawtooth current increases. These pulses of increasing current amplitude are applied to the above-mentioned magnetic cores. Thus, for example, the first pulse reverses the state of the first core of the series, the second pulse reverses the second core, etc.

Another object of this invention is to provide an improved emitter type pulse generator.

Other objects of the invention will be pointed out in the following description and claims and illustrated in the accompanying drawings, which disclose, by way of examples, the principle of the invention and the best mode, which has been contemplated, of applying that principle.

Figure 1:
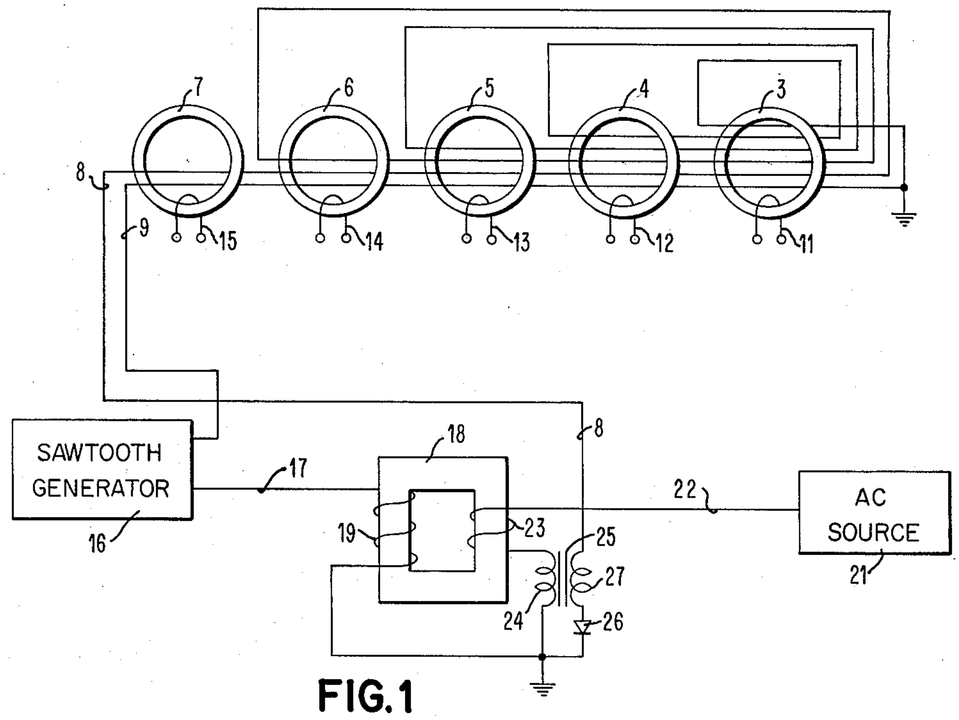
FIG. 1 is a schematic diagram of a pulse generator constructed in accordance with the present invention.

Referring to FIG. 1 there are shown a series or array of magnetic elements or cores 3, 4, 5, 6 and 7, each of the type having substantial magnetic retentivity. These cores may be of the well-known type having an excitation-response characteristic of a substantially rectangular hysteresis loop. A common conductor 8 serially connects each of the cores to energize each core in accordance with the number of turns of the conductor thereon. The core 3 is shown by way of example to have five turns of the common conductor threaded therethrough. The core 4 has four turns, the core 5 has three turns, the core 6 has two turns and the core 7 has a one turn winding thereon. The number of turns and the number of cores are shown diagrammatically to better disclose the principle of the invention, while in reality, the number of cores provided might be greater or less in number than those shown and the number of turns provided for each core might vary greatly. The cores 3, 4, 5, 6 and 7 are also threaded by a reset winding 9. Reset winding 9 may supply a reset pulse to all the cores simultaneously to reset the cores in a well-known manner. The cores 3, 4, 5, 6 and 7 each have an individual output winding associated therewith. These windings are respectively designated 11, 12, 13, 14 and 15. The output windings 11, 12, 13, 14 and 15 may be connected to any desired utilization device, such as, for example, a storage array of a serially operating data processing machine.

A sawtooth generator is shown at 16 and may be of any well-known type, such as, for example, a gas tube sawtooth generator. This sawtooth generator may also be equipped with a differentiator circuit to differentiate the trailing edge of the sawtooth waveform to produce a negative going signal. The negative going signal may be amplified and supplied as a current pulse to the reset winding 9 to reset the cores 3, 4, 5, 6 and 7 at the termination of each sawtooth pulse produced. The sawtooth pulse produced in generator 16 is supplied over line 17 to a magnetic amplifier 18. This sawtooth waveform is shown at *a* in FIG. 2. The sawtooth waveform on line 17 is supplied to one side of winding 19 of magnetic amplifier 18. The other side of winding 19 is connected to a fixed reference potential shown as ground.

Figure 2:
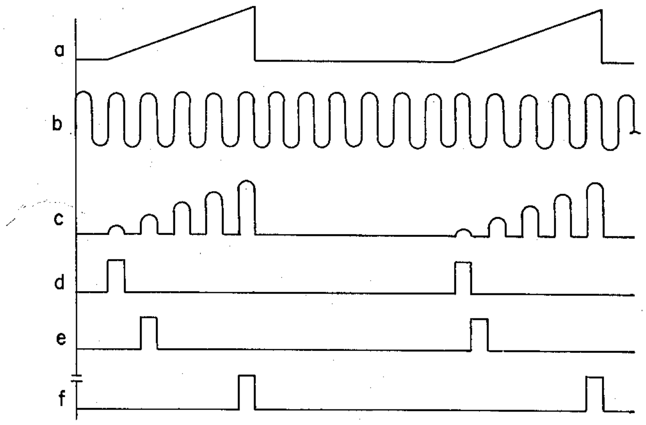
FIG. 2 is diagrammatic waveforms, drawn to a common time base, of signals appearing at several points throughout the circuit of FIG. 1.

An alternating current source 21 supplies an alternating current waveform to one side of a winding 23 on magnetic amplifier 18. The alternating current source may be any well-known oscillating mechanism such as a multivibrator with appropriate amplifying means. The output from source 21 is supplied over line 22 through winding 23 and through primary winding 24 of a transformer 25. The waveform from source 21 is shown at *b* in FIG. 2. As the sawtooth waveform applied to winding 19 increases, the saturable reactor goes further towards saturation and an increasing current is supplied through primary winding 24 of transformer 25. Thus, in response to the oscillations supplied from source 21 and the sawtooth waveform applied from sawtooth generator 16, the waveform shown at *c* in FIG. 2 is produced. This waveform at *c* in FIG. 2 is a series of pulses increasing in amplitude as the amplitude of the sawtooth waveform increases. A rectifier 26 is provided in the circuit of the secondary 27 of transformer 25 such that the negative going portion of the waveform produced at the secondary is cut off and only positive going pulses are applied over line 8 to the magnetic cores 3, 4, 5, 6 and 7.

As the first pulse occurs on line 8, as shown at *c* in FIG. 2, the core 3 is supplied with the correct number of ampere turns to cause core 3 to change from a first state of remanent flux to a second opposite state. In response to this change of magnetic state a pulse shown at *d* in FIG. 2 is produced on the output winding 11 of core 3. As the next pulse occurs on line 8, as shown at *c* in FIG. 2, core 4 is changed from its first state of remanent magnetization to a second opposite state and produces a pulse, shown at *e* in FIG. 2, on its output winding 12. Similar pulses are produced on windings 13, 14 and 15 as the associated cores change state. The pulse produced on winding 15 is shown at *f* in FIG. 2. Cores 3, 4, 5, 6 and 7 are sequentially changed from one state to another in the above manner to produce sequential output pulses on lines 11, 12, 13, 14 and 15. The cores 3, 4, 5, 6 and 7 are reversed in state one at a time since for a particular core a given number of ampere turns are required to reverse the state of the core. Five turns and a current pulse of a given amplitude is the equivalent of one turn and a pulse of five times the given amplitude insofar as the effect on the core is concerned.

In the above manner, a simplified and more reliable emitter type pulse generator has been provided. Although, as shown, one of the cores 3, 4, 5, 6 and 7 changes state in response to each pulse applied over line 8, this need not necessarily be the case. The core may be so wound that two, three or four, or any number of pulses in the sequence of ascending amplitude pulses may be required on line 8 to change the state of each core. In this manner, the circuit of FIG. 1 may act to count down the number of pulses supplied thereto. Thus, the emitter may be caused to advance one step for each *n* number of pulses applied thereto.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A pulse generator comprising a series of magnetic cores each capable of assuming bistable states of magnetic remanence, means for setting all the cores of said series to a first state of residual magnetization, a series conductor threading all the cores of said series and providing greater numbers of turns on successive cores of said series, sense winding means on said cores for sensing changes in the state of magnetization in the cores of said series, a magnetic amplifier having a pair of windings, means for coupling a sawtooth current pulse to one of the windings of said magnetic amplifier, means for coupling an alternating current to the other winding of said magnetic amplifier, transformer means having a primary and a secondary winding, one of said magnetic amplifier windings being coupled to said transformer primary winding, rectifying means connected to said secondary winding, and means coupling said secondary winding to said series conductor to provide current pulses of increasing amplitude thereto to sequentially change their state of magnetization in the cores of said series whereby a sequence of signals is provided on said sense windings.

2. An emitter comprising an array of magnetic cores each capable of assuming bistable states of magnetic remanence, means for magnetizing all said cores to a first state of magnetic retentivity, a conductor threading said cores and providing greater numbers of turns on successive cores of said array, a sense winding on each of said cores for sensing a change in the state of magnetization in the core on which the winding appears to produce an output signal, driving means comprising a magnetic amplifier, means for concurrently supplying sawtooth current pulses and an alternating current to said magnetic amplifier whereby a resultant signal of current pulses of increasing amplitude is developed, and means for coupling the resultant signal produced by said amplifier as an input to said conductor to thereby cause said cores to sequentially change their state of magnetization and provide a sequence of signals to said sense windings.

References Cited in the file of this patent

UNITED STATES PATENTS

| | | |
|---|---|---|
| 2,696,347 | Lo | Dec. 7, 1954 |
| 2,805,408 | Hamilton | Sept. 3, 1957 |
| 2,962,704 | Buser | Nov. 29, 1960 |

OTHER REFERENCES

Newhouse: "Magnetic and Ferro-Electric Computing Components," Electronic Engineering, May 1954, pages 192–199.